United States Patent [19]

Auinger

[11] 4,284,919

[45] Aug. 18, 1981

[54] POLE CHANGEABLE THREE PHASE WINDING

[75] Inventor: Herbert Auinger, Nuremberg, Fed. Rep. of Germany

[73] Assignee: Siemens Aktiengesellschaft, Munich, Fed. Rep. of Germany

[21] Appl. No.: 76,689

[22] Filed: Sep. 19, 1979

[30] Foreign Application Priority Data

Sep. 28, 1978 [DE] Fed. Rep. of Germany ....... 2842286

[51] Int. Cl.³ .............................................. H02K 3/00
[52] U.S. Cl. ...................................... 310/198; 318/773
[58] Field of Search ................ 310/180, 184, 198–208; 318/704, 773; 322/90; 336/223, 227

[56] References Cited

U.S. PATENT DOCUMENTS

| | | |
|---|---|---|
| 3,949,253 | 4/1976 | Broadway ............................ 310/184 |
| 4,013,909 | 3/1977 | Broadway ............................ 310/180 |
| 4,127,787 | 11/1978 | Auinger ................................ 310/184 |
| 4,138,619 | 2/1979 | Broadway ............................ 310/184 |
| 4,144,470 | 3/1979 | Auinger ................................ 310/198 |
| 4,200,817 | 4/1980 | Bratoljic .............................. 310/198 |

Primary Examiner—R. Skudy
Attorney, Agent, or Firm—Kenyon & Kenyon

[57] ABSTRACT

The present invention relates to a pole-changeable three-phase winding for $p_1:p_2=(3m\pm1)/3n$ (m and n being integers). This eliminates coils for the primary pole pair number $p_1$ in the base winding branches and the parallel-connected null winding branches which are active only in this level. The same number of additional coils with reduced turn number are additionally series-connected between the terminals of the secondary pole pair number $p_2$, so that at constant effective turn number $w_1$ times the winding factor $\xi_1$ a reduction of the copper losses is achieved.

6 Claims, 17 Drawing Figures

TABLES

| I | COIL SIDE GROUPS RESPECTIVELY IN ONE LAYER PER POLE AND PER PHASE INCLUDING 72 SLOTS FOR $2p_1=4$ | COIL PITCH 1-13 | | |
|---|---|---|---|---|
| | | $\xi_1$ | $\sigma_{01}\%$ | $B_1/B_2$ |
| a | $0\ \cdot\cdot\cdot\cdot\cdot\cdot\bullet\bullet\bullet\bullet\bullet\cdot\cdot\cdot\cdot\ \pi$ | 0,828 | 0,516 | 0,727 |
| b | $\bullet\ \bullet\bullet\bullet\bullet\ \bullet$ | 0,803 | 0,417 | 0,751 |
| c | $\bullet\ \ \bullet\bullet\bullet\ \bullet\bullet$ | 0,778 | 0,622 | 0,774 |

| II | COIL SIDE GROUPS OF (a), (b) AND (c) DERIVED BY REMOVAL OF COILS FROM THE ADDITIONAL ZERO WINDING BRANCHES (INEFFECTIVE COIL SIDES : 0) | | | |
|---|---|---|---|---|
| $a_1$ | $0\ \cdot\cdot\cdot\cdot\cdot\cdot\bullet\bullet\bullet\bullet\circ\cdot\cdot\cdot\cdot\cdot\ \pi$ | 0,840 | 1,052 | 0,860 |
| $a_2$ | $\bullet\bullet\bullet\bullet\circ\bullet$ | 0,828 | 0,877 | 0,873 |
| $a_3$ | $\bullet\bullet\bullet\circ\bullet\bullet$ | 0,821 | 0,810 | 0,880 |
| $b_1$ | $\bullet\ \bullet\bullet\bullet\circ\ \bullet$ | 0,797 | 0,888 | 0,906 |
| $b_2$ | $\bullet\ \bullet\bullet\circ\bullet\ \bullet$ | 0,791 | 0,764 | 0,913 |
| $c_1$ | $\bullet\ \ \circ\bullet\bullet\ \bullet\bullet$ | 0,781 | 1,312 | 0,925 |
| $c_2$ | $\bullet\ \ \bullet\bullet\bullet\ \circ\bullet$ | 0,780 | 1,011 | 0,926 |
| $c_3$ | $\bullet\ \ \bullet\circ\bullet\ \bullet\bullet$ | 0,615 | 1,187 | 0,9485 |
| $c_4$ | $\bullet\ \ \bullet\bullet\circ\ \bullet\bullet$ | 0,612 | 1,242 | 0,9489 |

⊙ FLUX-FREE SLOTS

COIL PITCH 1-13

6 POLE
COIL PITCH 1-13

6 POLE
COIL PITCH 1-12
OR 1-14

6 POLE
COIL PITCH 1-12
OR 1-14

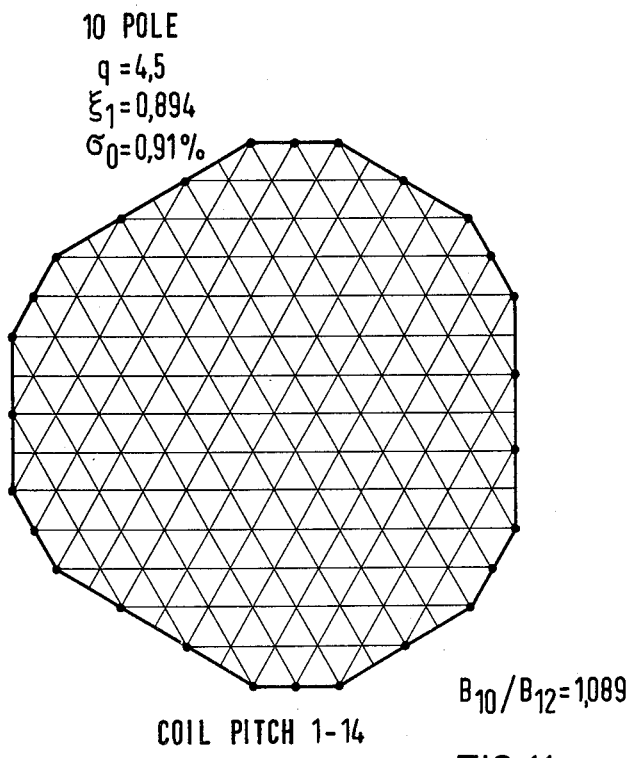
COIL PITCH 1-14  $B_{10}/B_{12}=1,089$
FIG 11
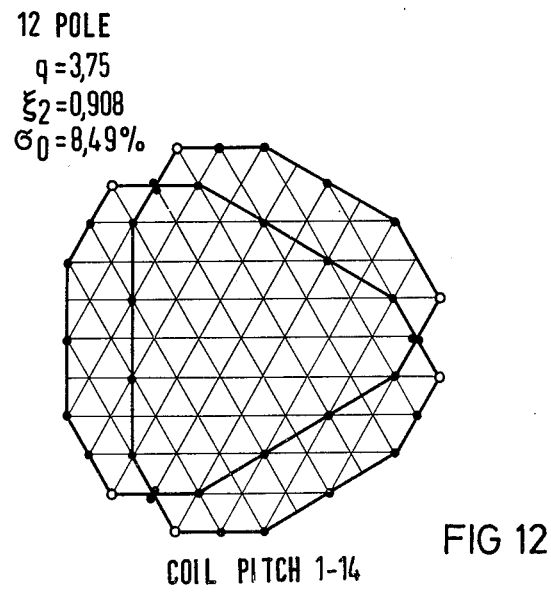
COIL PITCH 1-14 FIG 12

10 POLE
$q = 3$
$\xi_1 = 0.882$
$\sigma_0 = 1.43\%$

COIL PITCH 1-10

12 POLE
$q = 2.5$
$\xi_2 = 0.896$
$\sigma_0 = 9.22\%$ $B_{10}/B_{12} = 1.016$

COIL PITCH 1-10

10 POLE
$q = 3$
$\xi_1 = 0.869$
$\sigma_0 = 2.65\%$

COIL PITCH 1-9

12 POLE
$q = 2.5$
$\xi_2 = 0.937$
$\sigma_0 = 2.66\%$ $B_{10}/B_{12} = 1.079$

COIL PITCH 1-9

POLE CHANGEABLE THREE PHASE WINDING

BACKGROUND OF THE INVENTION

This invention relates to pole changeable three phase windings in general and more particularly to a pole changeable three phase winding for a fractional pole pair ratio of the first and second numbers of pole pairs $p_1$ and $p_2$ according to $p_1 \cdot p_2 = (3m \pm 1) : 3n$, where $p_2 = 3n$ is an integral multiple of the number of phases and m and n are positive integers.

A winding of the above type is disclosed in my U.S. Pat. No. 4,144,470 which issued on Mar. 13, 1979, the disclosure of which is incorporated herein by reference.

According to my '470 patent, each phase winding for the first number of poles $2p_1$ consists of $2p_1/t$ equal winding branches, of which a number G, divisible by three, of so-called base winding-branches carry current for the first number of poles $2p_1$ and for the second number of poles $2p_2$, where one third of each of the base winding branches, for the second number of poles $2p_2$, are assigned to all three phase windings. The remaining number N of winding branches are designed as zero or null winding branches which are ineffective for the second number of poles $2p_2$, so that a division into G base winding branches and N zero branches according to $G+N=2p_1/t$ takes place, where t is an integral divisor of $2p_1$.

The G base-winding branches may be connected in triple-Y/triple Y; delta/triple-delta; or Y/triple-delta. In a case of triple-Y/triple Y connection of the G base-winding branches, only six terminals are needed, and for the selective insertion of one of the two pole numbers, a single three-pole switch is sufficient. The null winding can be connected as desired, parallel to or in series with the base winding; however, only the use of a single null branch winding for the primary pole pair number $p_1$ not divisible by three is provided.

To attain favorable operating properties, in particular for drives at constant torque, it is desirable to obtain for both pole number levels equal air gap flux densities B to the extent possible, the ratio of the two flux densities to be not less than 0.85, if possible. In a winding with base-winding branches connected in triple-Y/triple-Y and parallel null winding branches, the phase turn numbers for both pole pair number levels are the same, so that for $p_2 > p_1$-because of the limited magnitude of the higher-pole winding factor $\xi_2$-there is to be provided for the lower primary pole number a phase-interspersed winding arrangement maintaining the winding and field symmetry and having a correspondingly reduced winding factor. As a result, however, the copper losses increase approximately as the square of the reciprocal winding factor at the lower primary pole number, the phase turn numbers being the same for both pole number levels. The essential operating properties depend on the effective turn numbers, which result from the product of winding factor and actual turn number.

SUMMARY OF THE INVENTION

It is an object of the invention to reduce the copper losses while maintaining favorable operating properties, i.e. without impairment of the magnetic symmetry, of a winding of the type in the '470 patent and thereby improve the efficiency and reduce heating in a machine equipped with such a winding.

The invention is based on the finding that for maintaining the effective phase turn numbers, an increase of the winding factor and a corresponding reduction of the phase turn number for the lower pole number level is possible, it being necessary in order to maintain the effective phase turn numbers for the higher pole number level to add to the thereby reduced base winding branches a corresponding number of additional coils in such a way that also the flux pattern remains unchanged.

In accordance with the invention, a pole-changeable three-phase winding is provided for a fractional pole pair number ratio of primary ($p_1$) and secondary pole pair numbers ($p_2$) according to $p_1 \cdot p_2 = (3m \pm 1) : 3n$ (m, n being positive integers), with G base winding branches operative in both pole number levels, one third of which are associated with all three phases and with N null winding branches operative only at the primary pole pair number ($p_1$), the division into G base winding and N null winding branches per phase occurring according to $G+N=2p_1/t$, wherein t is an integral divisor of $2p_1$ and G is divisible by the number three, in which the G base winding branches and the N null winding branches of the individual phases are carried out with a coil number reduced by an equal number of coils in accordance with a desired increase of the winding factor ($\xi_1$). Of the coils thus eliminated, a number of coils reduced in the radio $G:(G+N)$ are inserted between the terminals for the secondary pole pair number ($p_2$) and the coil-reduced G base winding branches as additional null winding branches Z.

In the embodiment in which G base winding branches for both pole pair numbers are connected in triple Y/triple Y, and N null winding branches are connected in parallel therewith and operative only at the primary pole pair number ($p_1$), the coils inserted as additional null winding branches Z are carried out with a turn number ($w_z$) reduced to one third as compared with the coils of the base winding branches G.

In accordance with one aspect of the invention, the total number of all coils is reduced by the number which corresponds to the number of coils eliminated in the N null winding branches. In accordance with other aspects of the invention, the additional null winding branches Z are formed exclusively by the coils eliminated in the G base winding branches and by coils eliminated both in the G base and in the N null winding branches.

In some embodiments of the invention, G base winding branches are connected in triple Y/triple Y, null branch windings N for $p_1$ are connected in parallel therewith, and series connected additional null winding branches Z for $p_2$ are provided.

These and other aspects of the invention will be more apparent from the following description of the preferred embodiments when considered with the accompanying figures and supplementary tables.

BRIEF DESCRIPTION OF THE DRAWINGS AND TABLES

The present invention is illustrated by way of example and not limitation in the figures of the accompanying drawings in which like numerals indicate similar parts and in which:

FIGS. 11 and 12 show the Gte,uml/o/ rges polygons for the winding according to FIG. 10 and the coil pitch 1-14;

Figure 13:
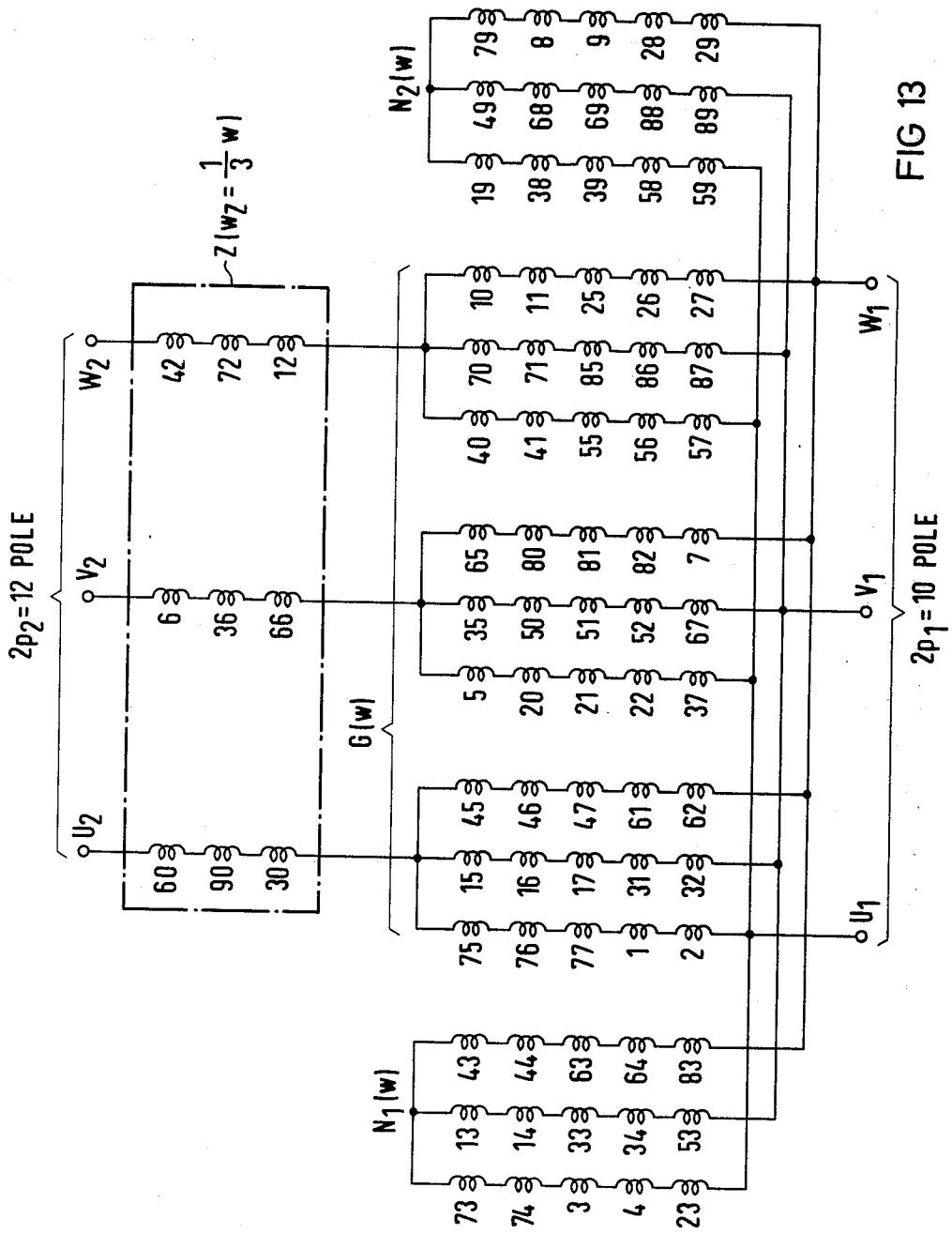
Figure 14:
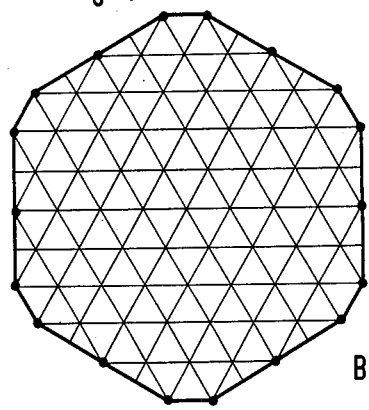
Figure 15:
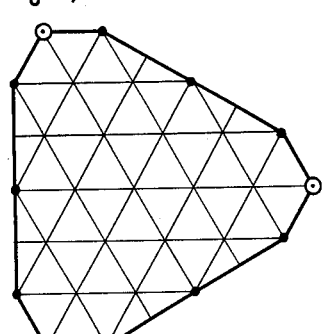
Figure 16:
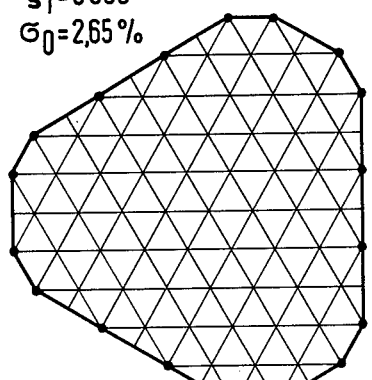
Figure 17:
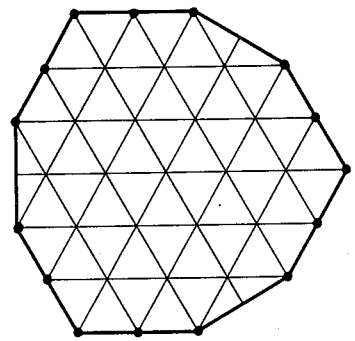

FIG. 13 is a wiring diagram of a 12/10-pole winding for 90 slots and $G:N=3:2$; and FIGS. 14 to 17 show the Gte,uml/o/ rges polygons for the winding according to FIG. 11 and the coil pitches 1-9 and 1-10.

In the Supplementary Tables:

Table I shows two symmetrical and one non-symmetrical coil side groups, respectively in one layer per pole and per phase winding with 72 slots for a primary pole number $2p_1=4$ and $q=6$ slots per pole and per phase winding as well as the associated values of the winding factors and harmonic leakage factors for both pole numbers and also the flux density relations for a 4/6-pole changeable winding; and Table II shows some coil side groups derived from the coil side groups of Table I by removal of coils from the base and null winding branches, with additional null branches for $2p_2=6$, the coil sides inoperative for the primary pole number $2p_1=4$ being marked with a circle (o).

DESCRIPTION OF THE PREFERRED EMBODIMENTS

In Table I, the three variants a, b and c with the highest winding factors are selected from a possible plurality of known coil groupings in respectively one layer per pole and per phase for a winding for 72 slots and the primary pole number $2p_1=4$ and the secondary pole number $2p_2=6$. All are carried out with a coil pitch 1-13, which corresponds to the pole pitch $\tau_2$ and hence results in the best possible field excitation curve at $2p_2=6$. Variants a and b are grouped symmetrically, variant c unsymmetrically. In addition, the respective harmonic leakage factors $$\sigma_0 = \frac{1}{\xi_1^2} \sum_{\nu \neq 1}^{\infty} (\xi\nu/\nu)^2$$

and the flux density relations $B_1/B_2$ are given. These known windings with null winding branches N operative only at the primary pole pair number and connected parallel to the base winding G, can, according to Table II, be modified in accordance with the variants $a_1$ to $a_3$, $b_1$, $b_2$ and $c_1$ to $c_4$ of the invention. The coil sides inoperative at $p_1$ are shown as circles, the operative coil sides as black dots.

Figure 2:
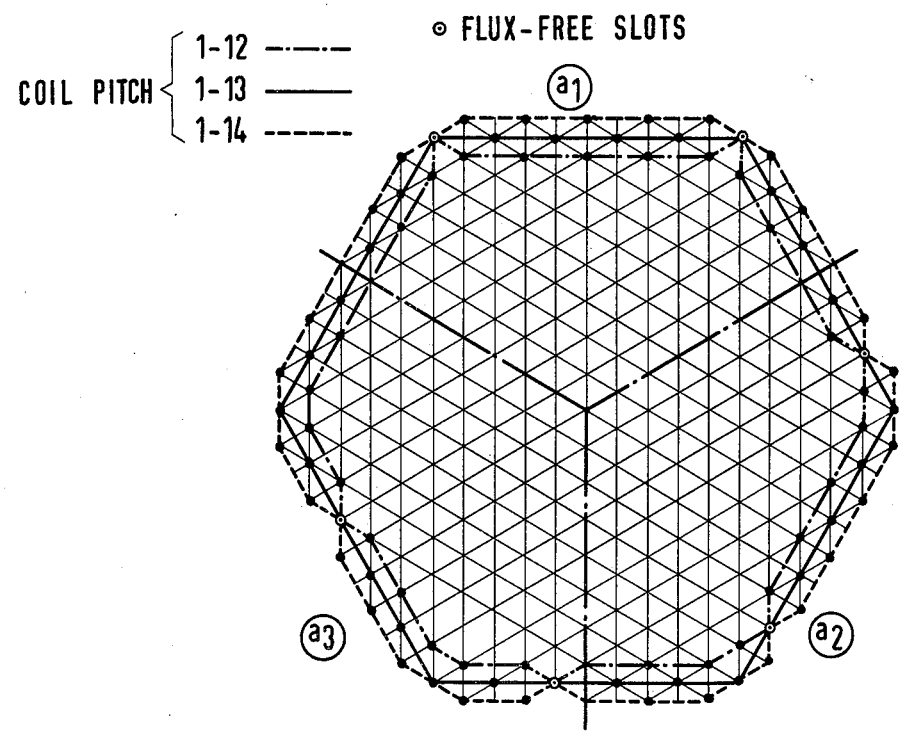
FIGS. 2 to 4 show sext-axially periodic Gte,uml/o/ rges polygons illustrating different coil pitch widths and different coil side groups according to Table II, one third of which are illustrated.
Figure 3:
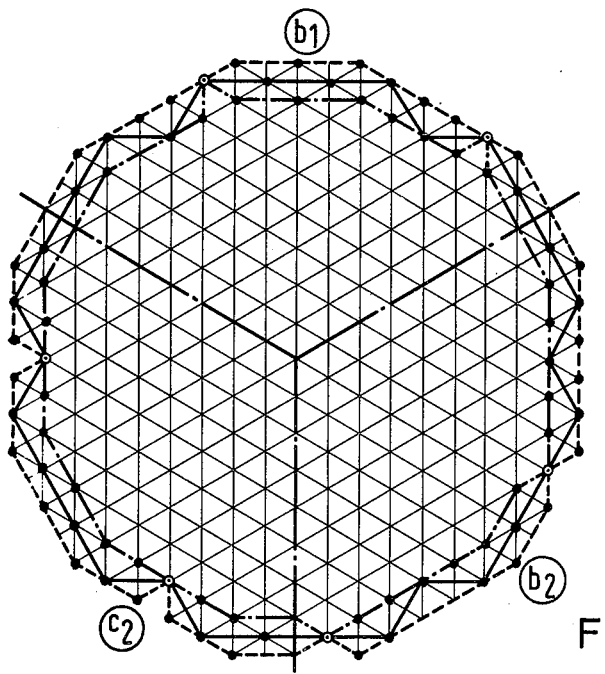
Figure 4:
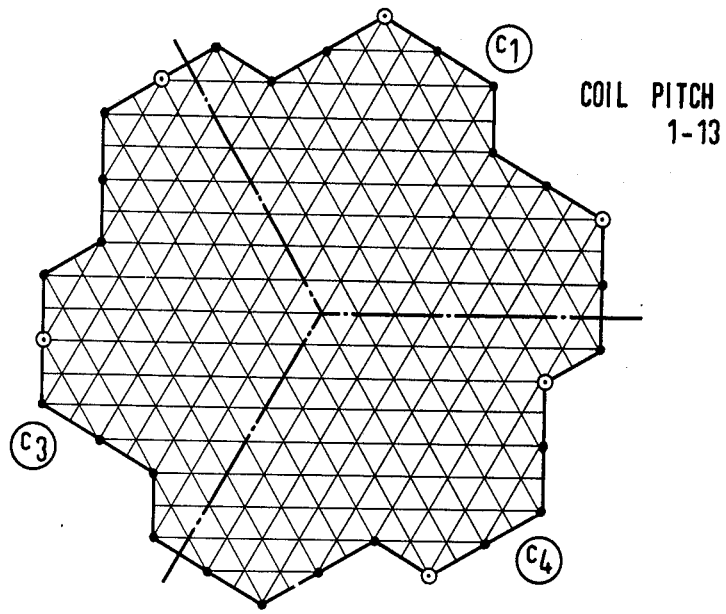

The Gte,uml/o/ rges polygons according to FIGS. 2 to 4, for the windings according to Table II formed in known manner from the vectorially joined slot fluxes, are sext-axially periodic, only one third being shown for the individual variants $a_1 \ldots c_4$. The curves in solid lines refer to a coil pitch 1-13, which means a diameter pitch for $2p_2=6$, a $\frac{2}{3}$ chorded winding for $2p_1=4$.

The curves in dash-dot lines apply to a coil pitch 1-12 (shortened pitch), the curves in broken lines, to a coil pitch 1-14 (lengthened pitch). The edge points marked with a dot in a circle indicate the positions of the flux-free slots originating from the omitted coils, their position is different for the individual variants $a_1$ to $c_4$. It can be seen from the six axis-symmetrical Gte,uml/o/ rges polygons that the various winding variants show field excitation curves relatively low in harmonic content already at a pitch width 1-13, which respectively contain only odd order numbers $\nu=6g\pm1(g=\text{integer})$.

A further reduction of the harmonic content can be obtained in the case of the variants $a_1$, $b_1$ with a pitch width 1-14, and in the case of variant $c_2$ with a pitch width 1-12.

For the 4-pole primary pole number level $2p_1$, in this instance winding factors are increased or decreased according to the coil chordings. In the 6-pole secondary pole number level $2p_2$, the same variation of the winding factor is obtained for shortened and lengthened pitch widths at pitch width 1-13 (over- or under-chording).

Thus, the flux density relations $B_1/B_2$ are increased at pitch widths 1-12 and decreased at pitch widths 1-14 as compared with the values shown in Tables I and II by about 5%. At pitch widths differing from the diameter pitch for $p_2$, there occur even harmonics in the secondary pole number level $2p_2=6$.

Figure 1:
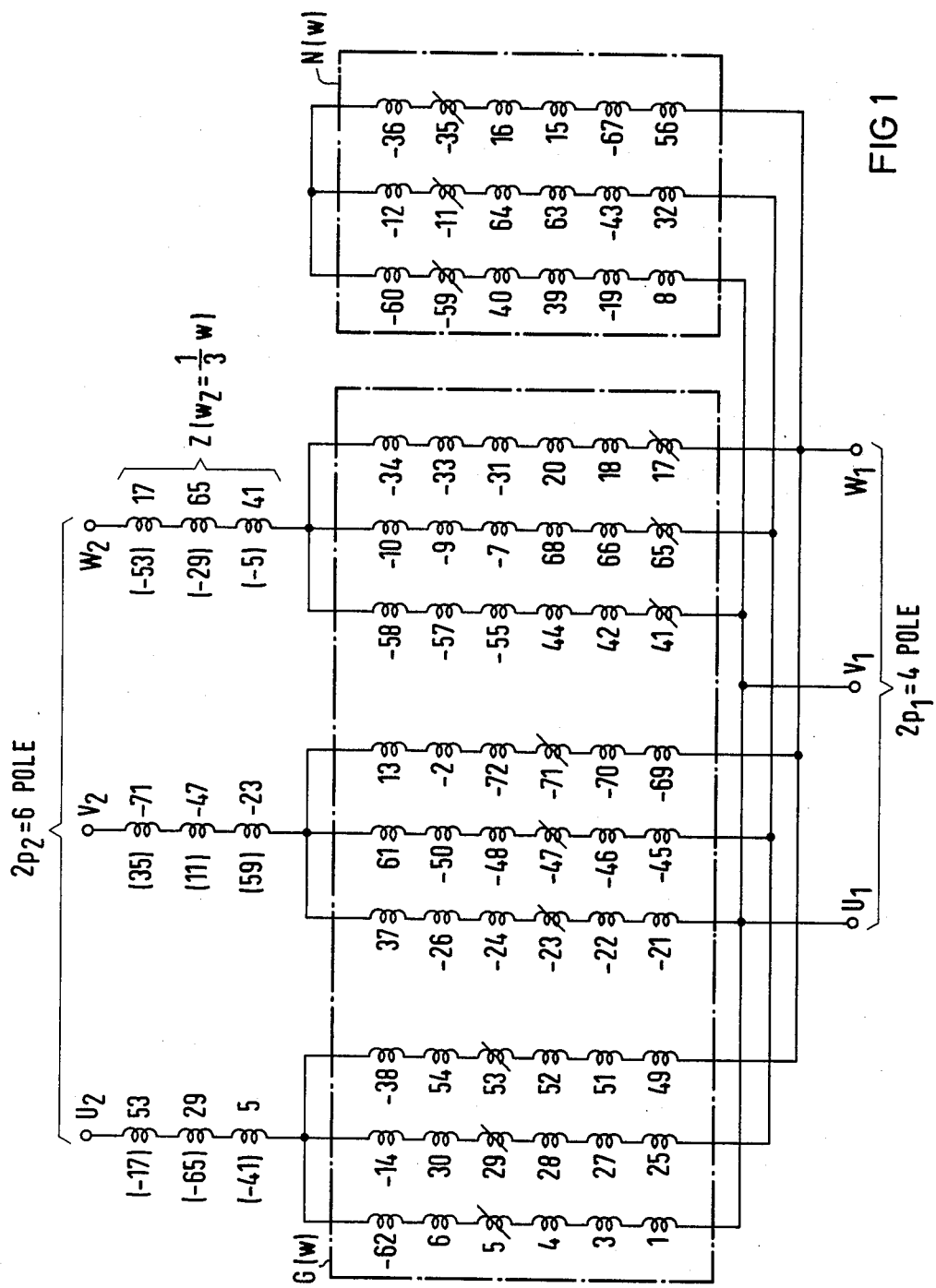
FIG. 1 is a winding circuit diagram illustrating two wiring versions of a winding for $2p_1:2p_2=4:6$ and 72 slots, the coil numbers in parentheses indicating the second version of the coil arrangement.

A 4/6-pole changeable winding as shown in FIG. 1 for 72 slots with nine base-winding branches G and three null winding branches N in common Y-connection normally comprises six coils per winding branch, i.e., a total of seventy-two coils.

Figure 5:
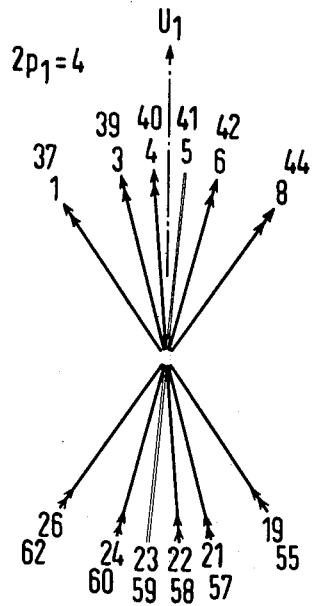
FIG. 5 is a vector diagram illustrating for the winding according to FIG. 1, the slot voltage vectors or arrows of phase winding $U_1$ for the primary pole number level $2p_1=4$.

FIG. 5 shows for phase $U_1$, the slot star with entered top layer coil sides for the primary pole number $2p_1=4$. The coil side distribution corresponds to the variant $b_2$ in Table II. The coils 5, 41 without arrow heads as well as the coils 23 and 59 flux-permeated in the opposite direction, are inoperative in 4-pole operation.

Figure 6:
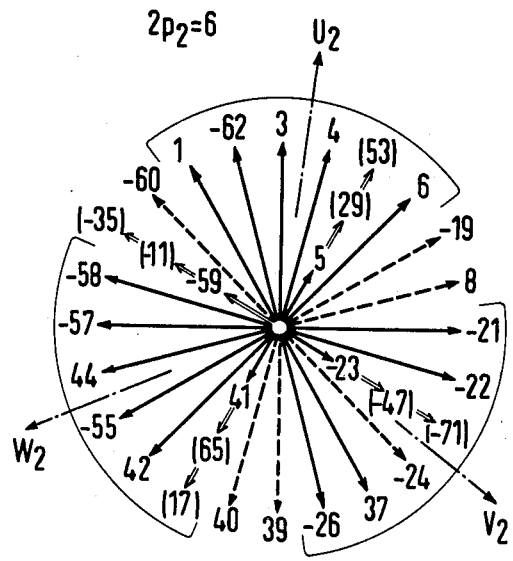
FIG. 6 is a vector diagram of the slot voltage vectors or arrows of phase winding $U_1$, uniformly fanned out over the entire periphery for the secondary pole number level $2p_2=6$, the coils of which then belong in equal parts to all three phases $U_2$, $V_2$, $W_2$.

In FIG. 6 the altered phase position for the secondary pole number $2p_2=6$ is illustrated. As can be seen, the vectors of a phase winding according to FIG. 5 are fanned out to the full angle $2\pi$ for the 6-pole level. For greater clarity, all slot voltage vectors are entered in a direction away from the center. The respective flux direction is indicated at the associated coil numbers by positive $(+)$ or negative $(-)$ signs. The coils are associated with the individual winding branches of the base winding G and with the parallel-connected null winding in the indicated manner; the six coils belonging to each phase of the base winding G and symmetrical with the axes $U_2$, $V_2$, $W_2$ are indicated by parentheses in FIG. 6. The two slot voltage vectors in broken lines, lying between them, belong to the null winding branch N. The coils omitted in the base winding G and in the null winding branches N are without arrow heads in FIG. 5. They are entered with their numbering also in the winding diagram according to FIG. 1 (being crossed out as "obviated" coils). They are realized with a turn number $W_Z$ reduced to one third and with an accordingly enlarged cross-section and are used for the formation of the 6-pole additional null winding branches Z inserted between the physically separated Y points of the base winding branches and the terminals $U_2$, $V_2$, $W_2$. The identically grouped phase windings U, V, W are arranged in space offset by one third the circumference of the machine, i.e. by twenty-four slots. The coils of the additional null winding branches Z carry triple the current as compared with the base-winding branches G.

In the first version, the crossed-out coils are omitted in the base winding branches. Instead, coils 5 ($U_1$), 29 ($V_1$) and 53 ($W_1$) in phase winding $U_2$, coils −23 ($U_1$), −47 ($V_1$) and −71 ($W_1$) in phase winding $V_2$, and coils 41 ($U_1$), 65 ($V_1$) and 17 ($W_1$) in phase winding $W_2$ are connected respectively between the Y-points of the individual phase windings for $2p_1=4$ of the base winding and the terminals for the secondary pole number level $U_2$, $V_2$, $W_2$. Due to the reduction of the number of coils in the base-winding and null-winding branches to five coils each, the voltages induced in the null winding branches at the secondary pole number level $2p_2=6$ no longer fully cancel each other out. This results in a potential difference in the amount of a coil voltage between the Y point of the null winding branches N and their beginnings $U_1$, $V_1$, $W_1$, but which only leads to a potential shift of said Y point not affecting the operational behavior. In all, however, the winding according to the invention remains exactly symmetrical in both pole number levels.

The three coils −59, −11 and −35 omitted in the null winding branches N are not inserted elsewhere, as is the case with the coils omitted in the base winding branches which, as has been set forth, form in a modified design the additional null winding branches Z, whose coil voltages cancel each other out at the primary pole number $2p_1=4$, so that the terminals $U_2$, $V_2$, $W_2$ are then potential-free. With the elimination of these three coils the copper weight is reduced by 3/72, or about 4% (copper saving).

The flux direction in the coils for the additional null winding branches can be selected independently of the primary pole number level. According to FIG. 6, it is possible to provide, instead of the coils of the base winding G mentioned for the additional null winding branches Z, the coils placed in parentheses in FIG. 1 from the base winding G and the null winding N, in diametrical position relative to the former, if the flux direction in FIG. 6 is reversed at the same time. Coils 23, 47 and 41 from the base winding branches G are then obviated.

Figure 7:
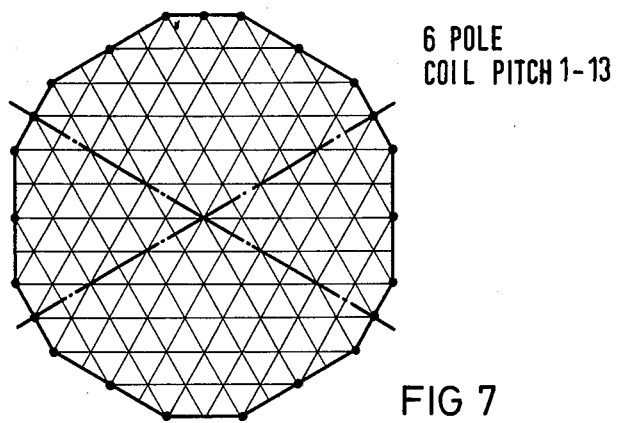
FIGS. 7 to 9 show several Gte,uml/o/ rges polygons for the secondary pole number level $2p_2=6$ in the two versions according to FIG. 1 at different coil pitches, FIG. 9 being the version indicated by parentheses in FIG. 1.

Taking FIG. 1 as a starting point, it is possible also in the additional null winding Z to interchange the branches of $U_2$ in $W_2$ or only to insert in $V_2$ the coils omitted there. In all three of the aforesaid modifications, the winding factor is $\xi_2=0.903$ at a coil pitch 1-13, and there always results the favorable Gte,uml/o/ rges polygon according to FIG. 7 with a harmonic content of $\sigma_0=0.830\%$.

Figure 8:
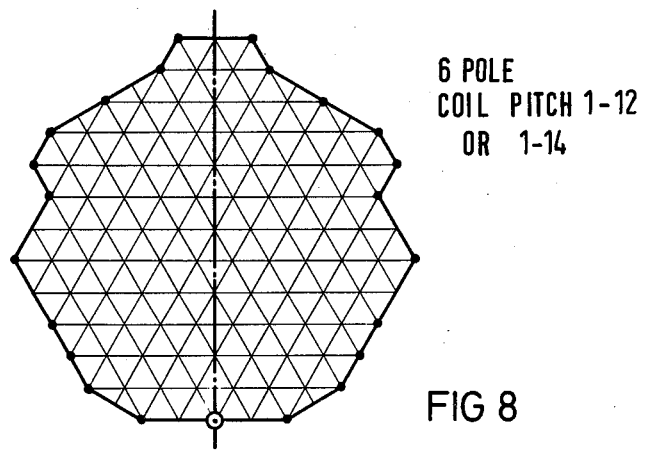
Figure 9:
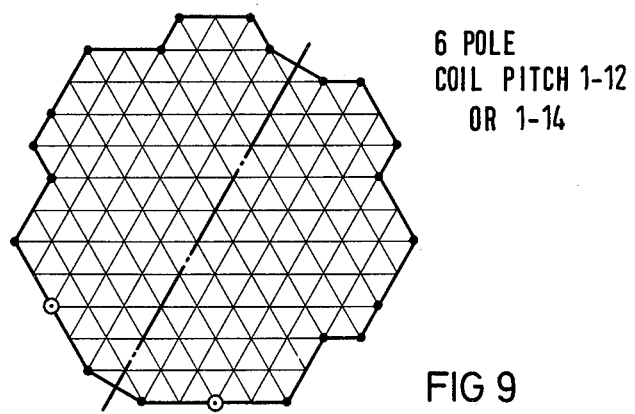

At coil pitch widths 1-12 or 1-14 differing from the diameter pitch 1-13, the Gte,uml/o/ rges polygons for the circuit variants shown in FIG. 1 are only uni-axially symmetrical according to FIGS. 8 and 9, indicating the presence of even harmonics.

The coil sides of the remaining winding branches G and N operative at the primary pole number $2p_1$, must, at variance with the known phase-interspersed form of construction with relatively low winding factor $\xi_1$, be grouped so that their winding factor is increased approximately reciprocally with the lower coil number and thus the effective phase turn number $\xi_1\nu_1$ remains unchanged. In accordance with the smaller coil number in said winding branches, the copper losses become smaller, and generally also the harmonic content of the field excitation curve is reduced (Gte,uml/o/ rges polygon).

The measure according to the invention is especially suited for pole-changeable windings with base winding branches G connected in triple Y/triple Y in which the primary pole pair number $p_1$ is greater than the secondary pole pair number $p_2$, reduced effective phase turn numbers being needed for the primary pole number level because of the desired balanced magnetic stress of the machine.

Figure 10:
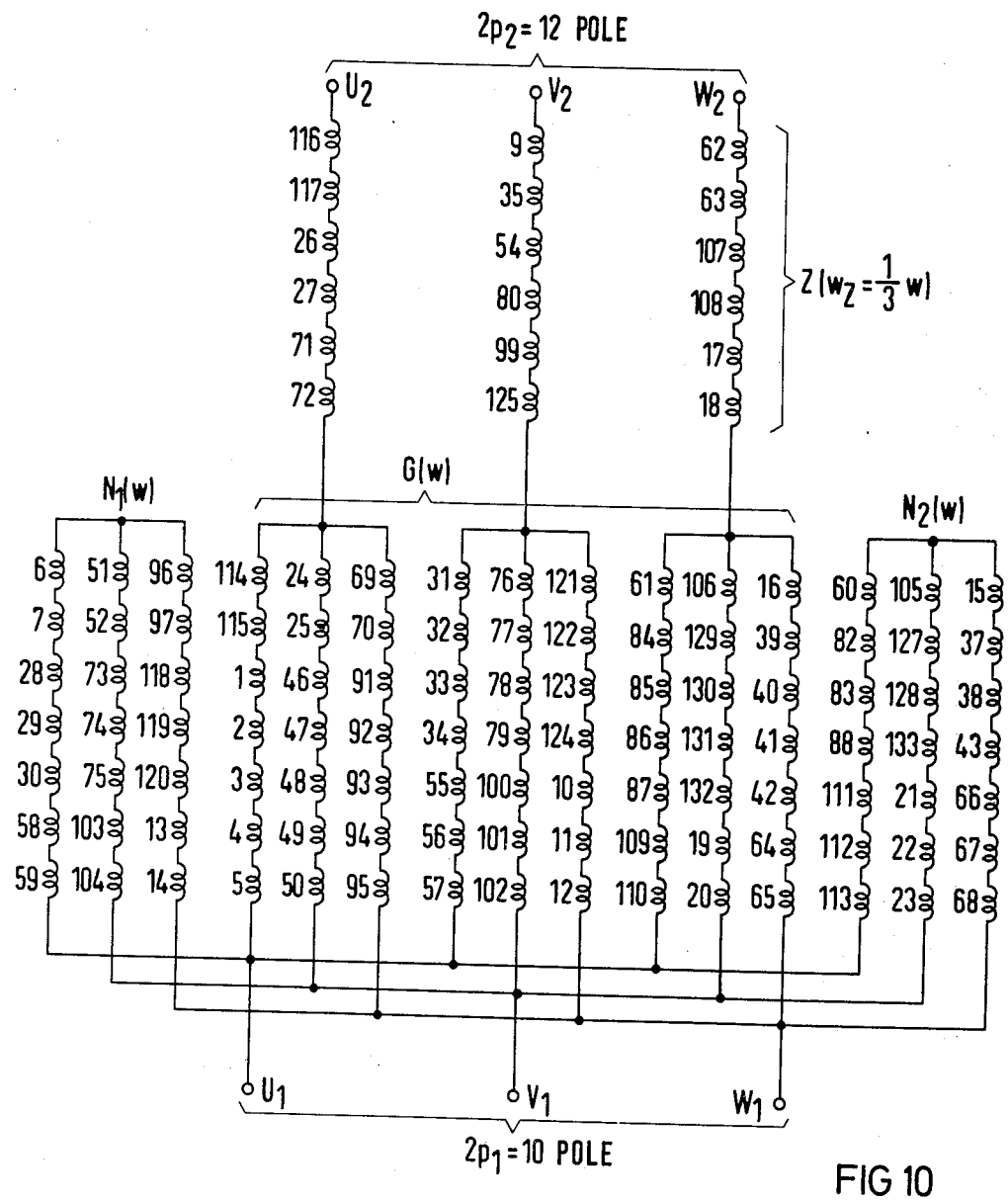
FIG. 10 is a wiring diagram of a 12/10-pole winding for 135 slots with $G:N=3:2$.

Two embodiments for a 12/10-pole changeable two-layer winding for different slot numbers are shown in FIGS. 10 and 13, which are suitable in particular for drive motors where a torque increasing with speed (rpm) is required, to which end a flux density ratio $B_1/B_2>1$ is sought. Since in higher-pole operation the required output is perceptibly smaller, it suffices if in the secondary pole number level $2p_2=12$ only about two thirds of the coils are live. And since moreover the field harmonic content may be noticeably higher in said little utilized level than in the primary pole number level $2p_1=10$, fractional slot windings with $q=3.75$ or respectively 2.5 slots per pole and per phase may be provided.

The starting point in both cases (FIGS. 10 and 13) is a 10-pole three-zone winding, divided in the ratio $G:N=3.2$ and connected in quintuple Y, where each winding train is normally composed of 135 and/or $90/5\times 3$ coils.

In the instance of the wiring according to FIG. 10 with 135 slots, of the $135/15=9$ coils, only seven coils, and in the instance of FIG. 13 with 90 slots, of the $90:15=6$ coils, only five coils are normally used.

In FIG. 10, the middle nine winding branches constitute the base winding G connected in triple Y/triple Y; to the right and left thereof are three parallel null branches $N_1$ and $N_2$. The $2\times 3=6$ coils not used for $2p_1=10$ in the base winding are realized with a turn number reduced to one third and are inserted as 12-pole additional null winding Z between the three centers of the base winding G and the terminals $U_2$, $V_2$, $W_2$. The coils omitted from the null branches $N_1$ and $N_2$, $2\times 3\times 2=12$ in all (8, 36, 44, 45, 53, 81, 89, 90, 98, 126, 134 and 135), are no longer needed in any pole number level. For 135 slots, therefore, only 123 coils need to be provided, owing to which the copper quantity is reduced by 9%. At the primary pole number $2p_1=10$, the main part of the winding (base winding G and null winding branches $N_1$, $N_2$), comprising 105 coils (7/9 of 135) and connected in quintuple Y, is active. In the second pole level, $105\times 3/5=63$ coils of the base winding G plus $3\times 6=18$ of the additional null winding branches, or a total of 81 coils, are live.

With the wiring according to FIG. 10, there results the Gte,uml/o/ rges polygon shown in FIG. 11 for the 10-pole level at $q=4.5$ slots per pole and per phase, and the Gte,uml/o/ rges polygon shown in FIG. 13 for the 12-pole level at $q=3.75$ slots per pole and per phase with a relatively high harmonic content ($\sigma_0=9.49\%$).

In the arrangement according to FIG. 13, at $2p_1=10$ only 5/6 of $90=75$ coils are operative, each winding branch of the main part of the winding connected in quintuple Y consisting of five coils. The additional null winding branches Z are formed by $3 \times 3 = 9$ coils with one third turn number, so that in 12-pole operation $3/5 \times 75 + 9 = 45 + 9 = 54$ coils are live. Six coils (18, 24, 48, 54, 78, 84) are eliminated in the null winding branches $N_1$ and $N_2$, so that there are in all only 84 coils (7% copper saving). The field form in the two pole number levels is evident from the Gte,uml/o/ rges polygons shown in FIGS. 14 to 17 (respectively for a coil pitch width of 1–10 or 1–9). The respective winding factors $\xi_1$ and $\xi_2$ the harmonic leakage factor $\sigma_0$ and the air gap flux density ratios $B_{10}/B_{12}$ can be seen from said figures.

By the elimination of coils, in particular from the null winding branches, it is thus possible to save copper, and the different design of the coils provided for the additional null winding branches Z involves practically no extra cost. Taken as a whole, in addition to the saving of copper, it is possible at $2p_1$ to attain lower copper losses, a lower harmonic content, and a more balanced magnetic stress without extra cost.

Such windings with partially utilized null winding branches N and additional null winding branches Z in both pole number levels are advantageous not only with a base winding connected in triple Y/triple Y but also with differently connected base winding branches G (delta/triple delta or Y/triple delta circuits with increased number of terminals) and can be realized analogously.

The advantages of the present invention, as well as certain changes and modifications of the disclosed embodiments thereof will be readily apparent to those skilled in the art. It is the applicant's intention to cover by his claims all those changes and modifications which could be made to the embodiment of the invention herein chosen for the purpose of the disclosure without departing from the spirit and scope of the invention.

What is claimed is:

1. In a pole-changeable three-phase winding for a fractional pole pair number ratio of primary $p_1$ and secondary pole pair numbers $p_2$ according to $p_1:p_2=(3m\pm1):3n$ (m, n being positive integers), with G base winding branches operative in both pole number levels, one third of which are associated with all three phases and with N null winding branches operative only at the primary pole pair number $p_1$, the division into G base winding and N null winding branches per phase occurring according to $G+N=2p_1/t$, wherein t is an integral divisor of $2p_1$ and G is divisible by the number three, the improvement comprising a reduction in the number coils in the G base winding branches and in the N null winding branches of the individual phases predetermined increase of the winding factor and a number of additional coils disposed between the terminals for the secondary pole pair number $p_2$ and the coil-reduced G base winding branches as additional null winding branches Z, the number of additional coils being equal to the reduction in the number of coils.

2. The improvement according to claim 1 in which G base winding branches for both pole pair numbers are connected in triple Y/triple Y, and N null winding branches are connected in parallel therewith and operative only at the primary pole pair number $p_1$, the additional coils having a turn number $w_z$ reduced by one third in comparison with that of the coils of the base winding branches G.

3. The improvement according to claims 1 or 2, in which the total number of all coils is reduced by the number which corresponds to the number of coils reduced in the N null winding branches.

4. The improvement according to claims 1 or 2, in which the additional null winding branches Z are formed exclusively by the coils eliminated in the G base winding branches.

5. The improvement according to claims 1 or 2, in which the additional null winding branches Z are formed by coils eliminated both in the G base and in the N null winding branches.

6. The improvement according to claim 1 in which the additional coils replace eliminated coils.

* * * * *